(12) United States Patent
Kita

(10) Patent No.: US 7,589,863 B2
(45) Date of Patent: Sep. 15, 2009

(54) METHOD OF DETERMINING IMAGE CORRECTION AND IMAGE PROCESSING APPARATUS USING THE METHOD

(75) Inventor: Koji Kita, Wakayama-ken (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 775 days.

(21) Appl. No.: 11/020,047

(22) Filed: Dec. 21, 2004

(65) Prior Publication Data
US 2005/0141038 A1 Jun. 30, 2005

(30) Foreign Application Priority Data
Dec. 25, 2003 (JP) ............... 2003-429684

(51) Int. Cl.
H04N 1/40 (2006.01)
(52) U.S. Cl. ........................ 358/1.9; 358/527
(58) Field of Classification Search ................ 358/1.9, 358/2.1, 504, 406, 452, 527; 348/333.05, 348/333.11; 396/374
See application file for complete search history.

(56) References Cited
U.S. PATENT DOCUMENTS
5,539,426 A * 7/1996 Nishikawa et al. .......... 345/635

6,333,752 B1 * 12/2001 Hasegawa et al. ........... 715/764
7,324,749 B2 * 1/2008 Kubo ........................ 396/429

FOREIGN PATENT DOCUMENTS
JP 1132227 5/1989
JP 2000-324339 11/2000
JP 2003333412 11/2003
JP 2003-429684 12/2003
JP 2004227402 8/2004

* cited by examiner

Primary Examiner—Thomas D Lee
Assistant Examiner—Stephen M Brinich
(74) Attorney, Agent, or Firm—Fulbright & Jaworski LLP

(57) ABSTRACT

A method of determining image correction includes the steps of: obtaining image data representing a photographic frame image as source image data, effecting an image correction by a predetermined correction degree on the obtained source image data, thus generating corrected image data, displaying a correction reproduced image based on the corrected image data on a monitor, and fixedly determining a final correction degree for an image correction to be eventually effected on the source image data while monitoring the correction reproduced image. At the step for generating corrected image data, a plurality of corrected image data are generated by effecting the correction on the source image data with a plurality of differing correction degrees, and at the displaying step, a plurality of correction reproduced images based on selected ones from the plurality of corrected image data are displayed according to the order of correction degrees.

12 Claims, 9 Drawing Sheets (G (n, n): no correction)

(IM(n,n) un-corrected image data)

FIG.6
(a)
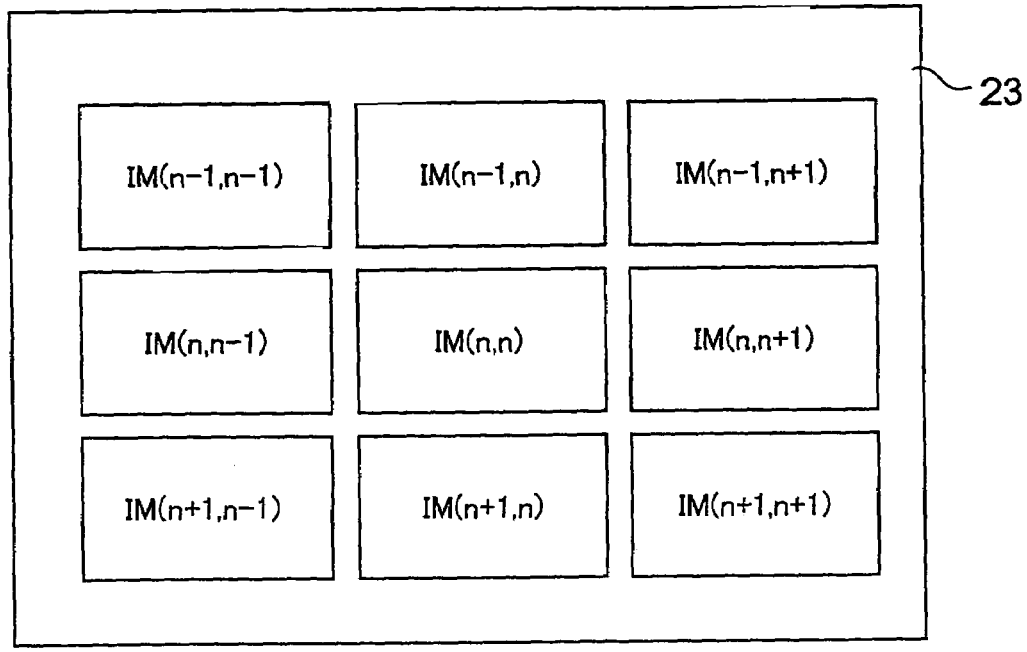
(IM(n,n) un-corrected image data)
(b)
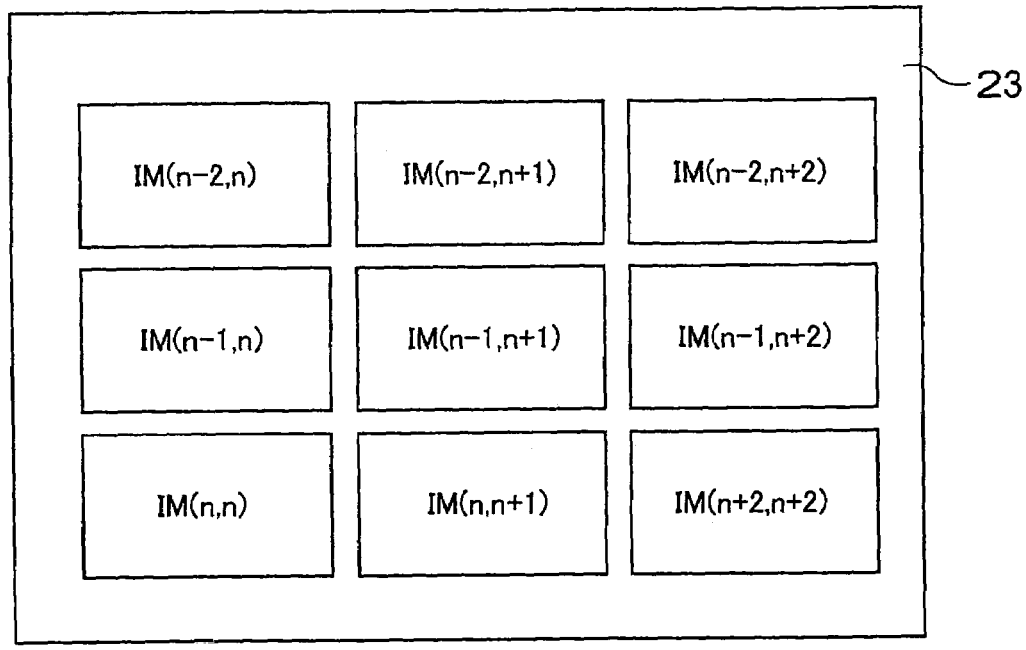
(IM(n,n) un-corrected image data)

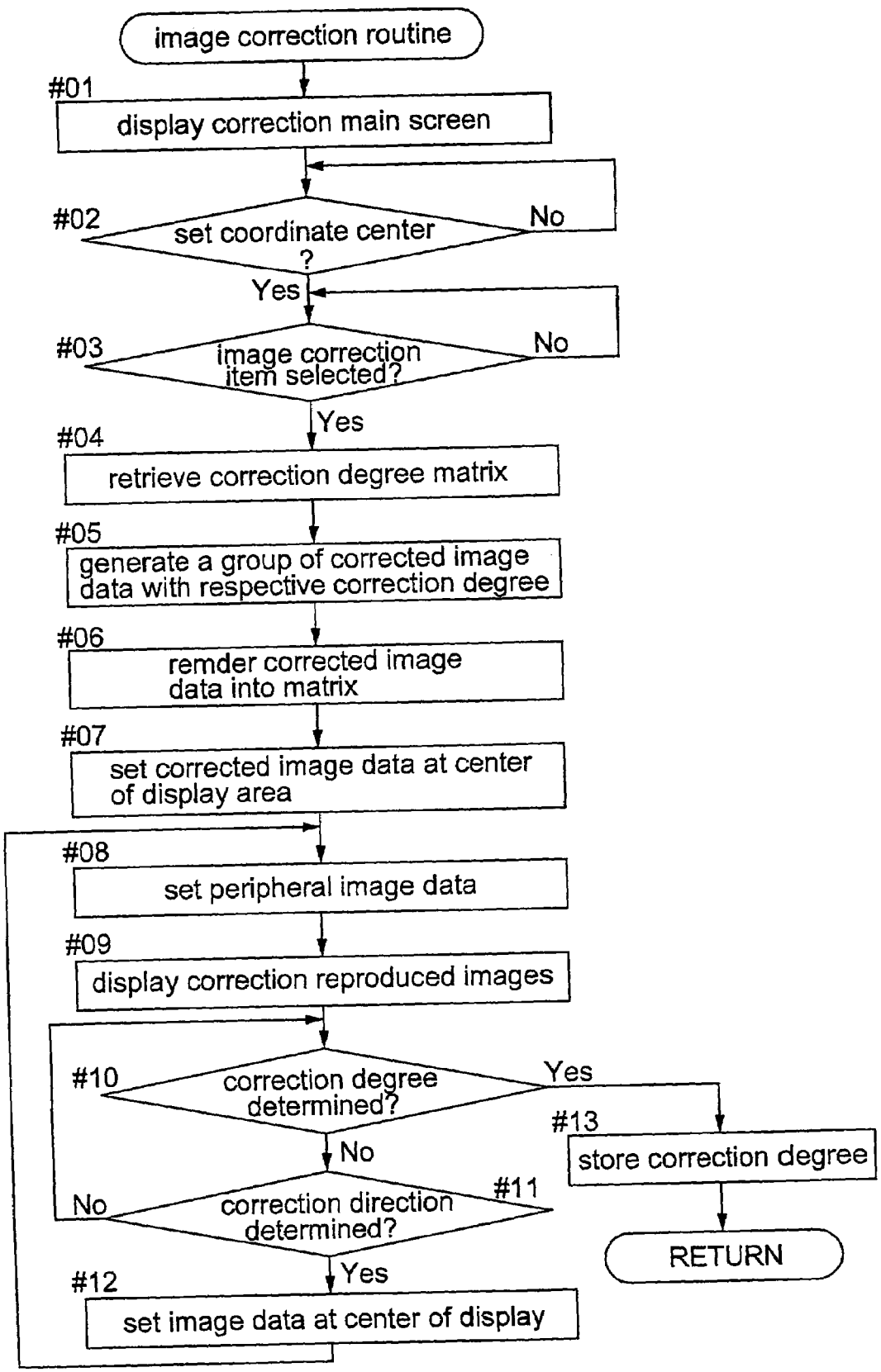

METHOD OF DETERMINING IMAGE CORRECTION AND IMAGE PROCESSING APPARATUS USING THE METHOD

BACKGROUND OF THE INVENTION

1. Field of the Invention

The present invention relates in general to a technique of determining image correction. More particularly, the invention relates to a method of determining image correction including the steps of obtaining image data representing a photographic frame image as source image data, effecting an image correction by a predetermined correction degree on the obtained source image data, thus generating corrected image data, displaying a correction reproduced image based on the corrected image data on a monitor, and fixedly determining a final correction degree for an image correction to be eventually effected on the source image data while monitoring the correction reproduced image.

2. Description of the Related Art

In recent years, the so-called "mini-lab" system (photographic printing system) has been in use widely. According to this system, based on source image data such as image data obtained by digitization of a photographic frame image formed in a photographic film by using a film scanner or image data obtained by direct digitization of a photographic image by a digital photographic apparatus such as a digital camera, an optical beam emitted from an exposure head is controlled to scan and expose a photosensitive material (e.g. print paper) with this controlled beam, thereby to form an image thereon and the resultant material (paper) printed with this image is outputted from the system. Such photographic printing system as above allows various image corrections on the source image data inputted thereto before making a photo print thereof, so as to make a photo print of improved quality. The available corrections include density correction for compensating for overexposure or underexposure, correction of partial dropouts or loss of gradation in the image resulting from backlight or flash photography, and a sharpening correction for improving loose focus. Further, with improvement in image processing technique in the photographic printing, the system makes also available such correction of image deterioration resulting from transverse chromatic aberration and distortion due to aberration characteristics inherent in the photographic lens used, image deterioration due to insufficient brightness in image field edge (insufficient peripheral light amount), unnaturalness of image due to excessive lens swing/tilt distortion.

However, while such various image corrections are made possible, the system generally requires an operator's visual judgment using a reproduced image displayed on a monitor in decision of correction(s) to be actually made by the system. Therefore, the operability of the system is essential if speedy and accurate judgment by the operator is to be expected.

On the other hand, a type of image processing apparatus is known, from e.g. Japanese Patent Application "Kokai" No. 2000-324339 (see paragraphs [0018] and [0042] and FIG. 5). This image processing apparatus includes a monitor for displaying a reproduced image based on image data obtained from an optically photographed image by using a photographic lens in order to allow appropriate corrections for image deterioration such as distortion, transverse chromatic aberration due to lens characteristics, insufficient peripheral light amount, out-of-focus etc., a correction specifying section for allowing an operator to decide whether to effect a correction on the image quality deterioration based on the reproduced image being displayed, a temporary correcting means for specifying an appropriate correction intensity for the image quality deterioration according to the operator's specification and then displaying a correction reproduced image on the monitor for each correction made, a correction intensity determining means for fixedly determining a final correction intensity based on the correction reproduced image displayed on the monitor by the correction specifying means, and a correcting means for effecting a final correction based on the determined final correction to obtain output image data.

A lens-related correction assisting screen of this known image processing apparatus is configured to display an image prior to the temporary correction as an image to be tested and an image after the temporary correction on which the operator judges whether to fixedly determine the correction intensity, with the former image being displayed on the right side of the screen and the latter image being displayed on the left side of the same. The image prior to the temporary correction is a reproduced (and uncorrected) image of an image recorded in a photographic film for which the operator has judged an image correction is needed or an image after a preset correction using a predetermined correction intensity. The lens-related correction assisting screen includes, at a lower portion thereof, a sharpness correction box, a peripheral light amount correction box, a vertical distortion correction box, a horizontal distortion correction box, a correction level box for determining the correction intensity and a temporary correcting button. In response to a single mouse click of the temporary correcting button, the correction (intensity) level is incremented/decremented. With this, coefficients used in a correction mathematical expression, e.g. coefficients in respective terms in the case of a higher-order, polynomial expression, are varied, so that a correction intensity is determined by the expression having the varied coefficients. Then, based on the correction intensity thus determined, a temporary correction is effected and the monitor displays the image after the temporary correction.

In the above-described image correction operation of the image processing apparatus, the monitor displays only the image used as a reference image and the image after the temporary correction. The apparatus does not allow operator's simultaneous visual comparison between an image corrected by a high correction intensity and an image corrected by a low correction intensity relative to the reference image by viewing of these images at one time on the screen. For this reason, after the operator finds that the temporary corrected image is approximate to an appropriate image, the operator still needs to effect, in a trial-and-error manner, a plurality of times of temporary corrections with slightly different correction intensities to eventually arrive at the appropriate image. This poor operability results in increase in the time required for the image correcting process.

SUMMARY OF THE INVENTION

In view of the above-described state of the art, a primary object of the present invention is to provide an improved technique by which the operator can effect efficiently and effectively the operation of fixedly determining the correction intensity or degree for the source photographic image while confirming a correction reproduced image being displayed on a monitor.

For accomplishing the above-noted object, a method of determining image correction according to the present invention comprises the steps of:

obtaining image data representing a photographic frame image as source image data;

effecting an image correction by a predetermined correction degree on the obtained source image data, thus generating corrected image data;

displaying a correction reproduced image based on the corrected image data on a monitor, and fixedly determining a final correction degree for an image correction to be eventually effected on the source image data while monitoring the correction reproduced image;

wherein at said step for generating corrected image data, a plurality of corrected image data are generated by effecting the correction on the source image data with a plurality of differing correction degrees, and at said displaying step, a plurality of correction reproduced images based on selected ones from the plurality of corrected image data are displayed according to the order of correction degrees.

With the above-described construction, the monitor displays a plurality of correction reproduced images obtaining by effecting image correction with plural differing correction degrees (including 0 correction degree=no correction) on the image data representing a photographic frame image subjected to the image correction. Hence, the operator can determine the final correction degree for making a desired image while monitoring the plurality of these correction reproduced images being displayed on the monitor. In this, the displaying of the plurality of correction reproduced images with differing correction degrees allows e.g. the operator to confirm a series of different correction reproduced images relating to a same photographic frame image to be subjected to the image correction. Hence, the operator's selection of the final correction degree can proceed in an efficient and effective manner. Especially, when the operator is to select the "best" correction degree from those "better" correction degrees narrowed down so far, the operator can effect this final selection easily even if the differences in correction degrees among the respective correction reproduced images are slight.

Further, if a plurality of corrected image data greater in number than the correction reproduced images to be displayed at one time on the monitor are generated in advance, it becomes possible for the monitor to instantly display a group of correction reproduced images having differing correction degrees, and a next group of such images, without any intermission therebetween. This will contribute significantly to speedy determination of correction degree.

As described in the foregoing section herein, the image correction operations requiring an operator's confirmation of a correction reproduced image and fine adjustment of the correction degree include correction of image deterioration resulting from transverse chromatic aberration and distortion due to aberration characteristics inherent in the lens used, image deterioration due to insufficient peripheral light amount, unnaturalness of image due to excessive swing/tilt distortion, etc. For this reason, the technique proposed by the present invention is particularly suitable for compensating for deterioration occurred in the image quality due to the lens used in the photography.

Further, in general, the aberration or distortion described above has two-dimensional extension relative to a point (reference point) in the image free or almost free from such aberration or distortion. For this reason, the correction degree therefor needs to be set with two-dimensional extension. Then, according to one preferred embodiment of the present invention, said correction degree includes a correction direction degree representing a direction of correction and a correction intensity degree representing an intensity of correction. This can be realized by e.g. providing a two-dimensional matrix having differing correction degrees as its entries, with one of the correction direction and the correction density being associated with the column of the matrix, the other being associated with the row of the same. By varying respective correction degrees according to their positions in the matrix, there can be made a group of correction degrees considering both the correction direction and the correction intensity. By correlating corrected image data obtained by correcting the source image data by using such correction degree matrix with their positions in the matrix, there is produced a group of corrected image data sorted according to the correction direction and the correction intensity. Further, if one area is specified from the group of corrected image data in the form of matrix and a plurality of correction reproduced images are displayed on the monitor in the form of a "sub-matrix", the operator can select efficiently one particular correction reproduced image with an appropriate correction degree while viewing the plurality of correction reproduced images having a same correction direction in comparison with each other. In this, since the appropriate number of the correction reproduced images displayed in the form of sub-matrix, that is, the size of the displayed matrix will differ depending on the size, maximum resolution of the monitor or on the operator's taste, it is preferred that the number be freely set.

The aberration and distortion due to the photographic lens vary significantly for each lens and/or photographic condition. Hence, the preset correction degrees therefor have a wide range. For this reason, in order to allow the operator to quickly arrive at the correction reproduced image corrected with a desired correction degree, according to one preferred embodiment of the present invention, in response to an operator's specification of one of the correction reproduced images displayed in the form of matrix, a new matrix of a group of correction reproduced images is produced and displayed on the monitor which new matrix is formed around the specified correction reproduced image as its center. With this feature, the operator can speedily arrive at the optimum correction reproduced image by continuously specifying the correction reproduced image located on the outermost entry in the correction direction desired by the operator.

In the case of an aberration or distortion due to a lens of a non-lens-exchangeable camera, it is assumed that such aberration is commonly suffered by all photographic frame images obtained from a photographic film or memory card or the like given by the customer at the time of order for photographic prints. Hence, in such case, it is preferred that a correction degree fixedly determined for one particular photographic frame image (a first frame image) be used also for image correction for the other frame images.

The present invention relates also to a program for causing a computer to execute the above-described image correction determining method as well as to an image processing apparatus implementing the method. Referring to the image processing apparatus for instance, this apparatus comprises:

an image inputting section for obtaining image data representing a photographic frame image as source image data;

a correction degree setting section for setting a correction degree for a particular image correction for the source image data;

an image processing section for effecting the image correction on the source image data by the set correction degree to generate a corrected image data; and an image correction managing section for causing a monitor to display a correction reproduced image based on the corrected image data and allowing an operator to fixedly determine a final correction degree for the image correction to be eventually effected on the source image data while monitoring the correction reproduced image on the monitor;

wherein said correction degree setting section sets a plurality of corrected image data by effecting the correction on the source image data with a plurality of differing correction degrees, and said image correction managing section causes the monitor to display a plurality of correction reproduced images based on selected ones from the plurality of corrected image data according to the order of correction degrees. Needless to say, such image processing apparatus can provide all the functions/effects of the image correction determining method described above.

According to one preferred embodiment of the invention, said correction setting section includes a correction degree lookup table comprised of a correction degree matrix including a plurality of correction degrees defined by a correction direction and a correction intensity in the photographic frame image arranged therein as entries thereof. With this, by associating the corrected image data obtained by correction of the source image data with respective positions (entries) in the correction degree matrix by using such correction degree lookup table, there can be produced and displayed a group of corrected image data sorted according to the correction direction and the correction intensity. And, by specifying one area after another in the correction data group prepared in the form of matrix, the operator can efficiently select one particular image with the appropriate correction degree while viewing the plurality of correction reproduced images having a same correction direction in comparison with each other.

Further and other features and advantages of the present invention will become apparent upon reading the following detailed description of the presently preferred embodiments thereof with reference to the accompanying drawings.

BRIEF DESCRIPTION OF THE DRAWINGS

FIGS. 6a and 6b are explanatory views for explaining the corrected image data to be displayed at a reproduced image matrix display area, FIG. 12 is a flowchart as an example of image correction routine,

DESCRIPTION OF THE PREFERRED EMBODIMENTS

Preferred embodiments of the present invention will be described next with reference to the accompanying drawings.

Figure 1:
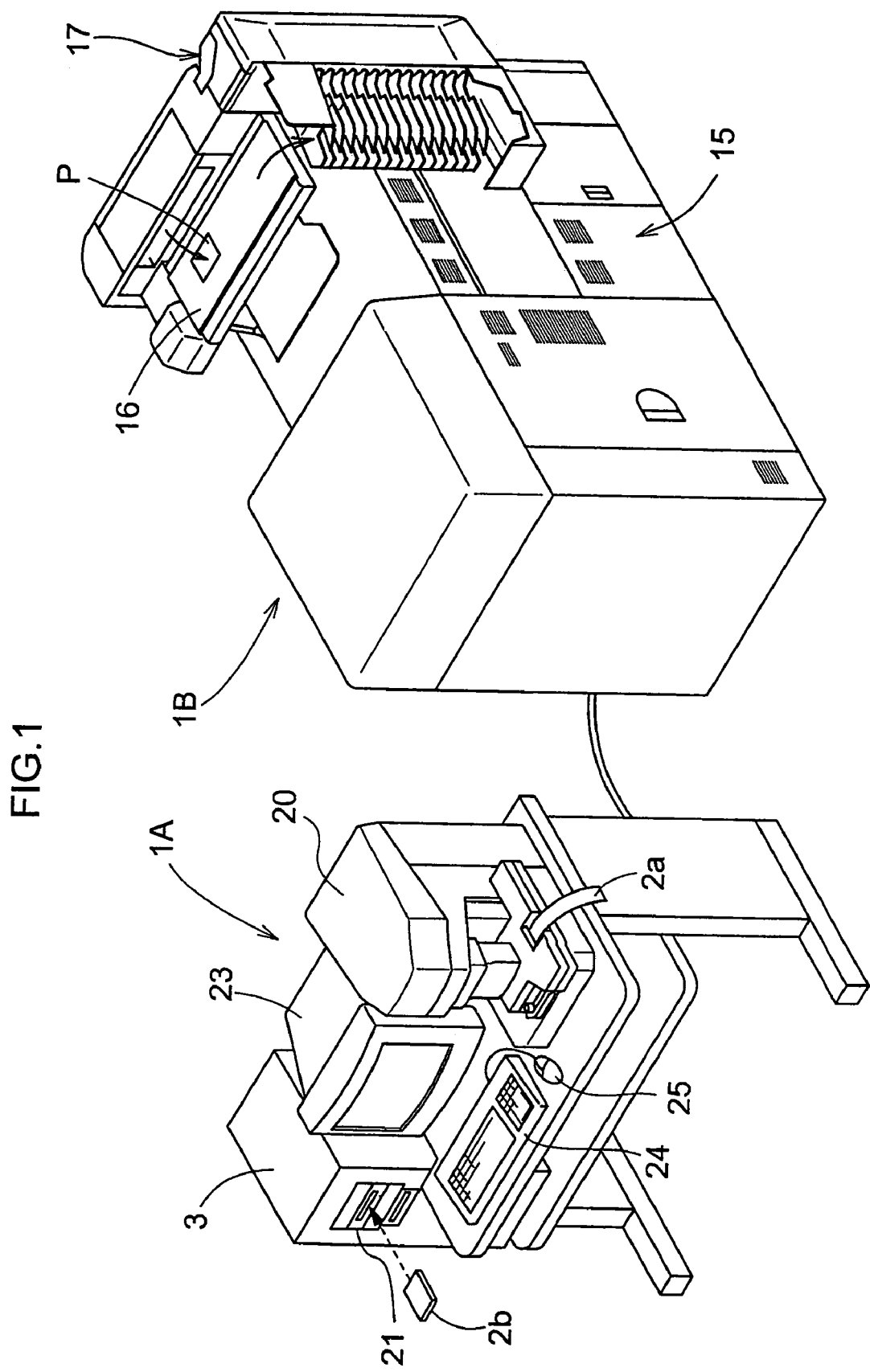
FIG. 1 is a view showing an outer appearance of a photographic printing system implementing an image correction determining method relating to the present invention.

FIG. 1 is an outer appearance view of a photographic printing system incorporating an image processing apparatus implementing an image correction determining method relating to the present invention. This photographic printing system consists primarily of a print station 1B acting as a photographic printer for effecting an exposure and a development on a print paper P and a control station 1A for processing photographic images from a developed photographic film (to be referred to as "film" hereinafter) 2a or an image storage medium such as a memory card 2b for a digital camera and generating and transmitting print data to be used in the print station 1B.

Figure 2:
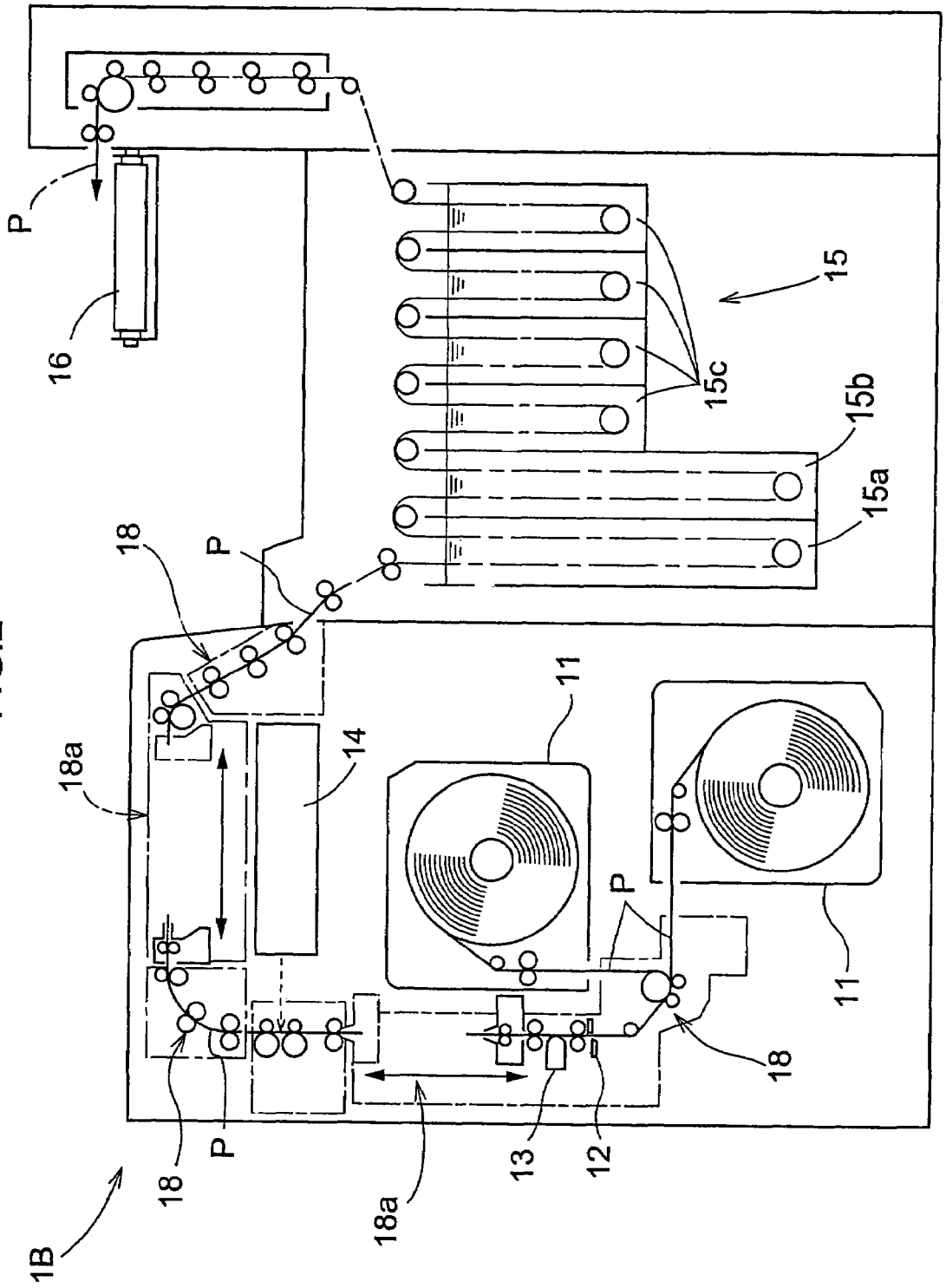
FIG. 2 is a diagram schematically showing a construction of a print station included in the photographic printing system.
Figure 3:
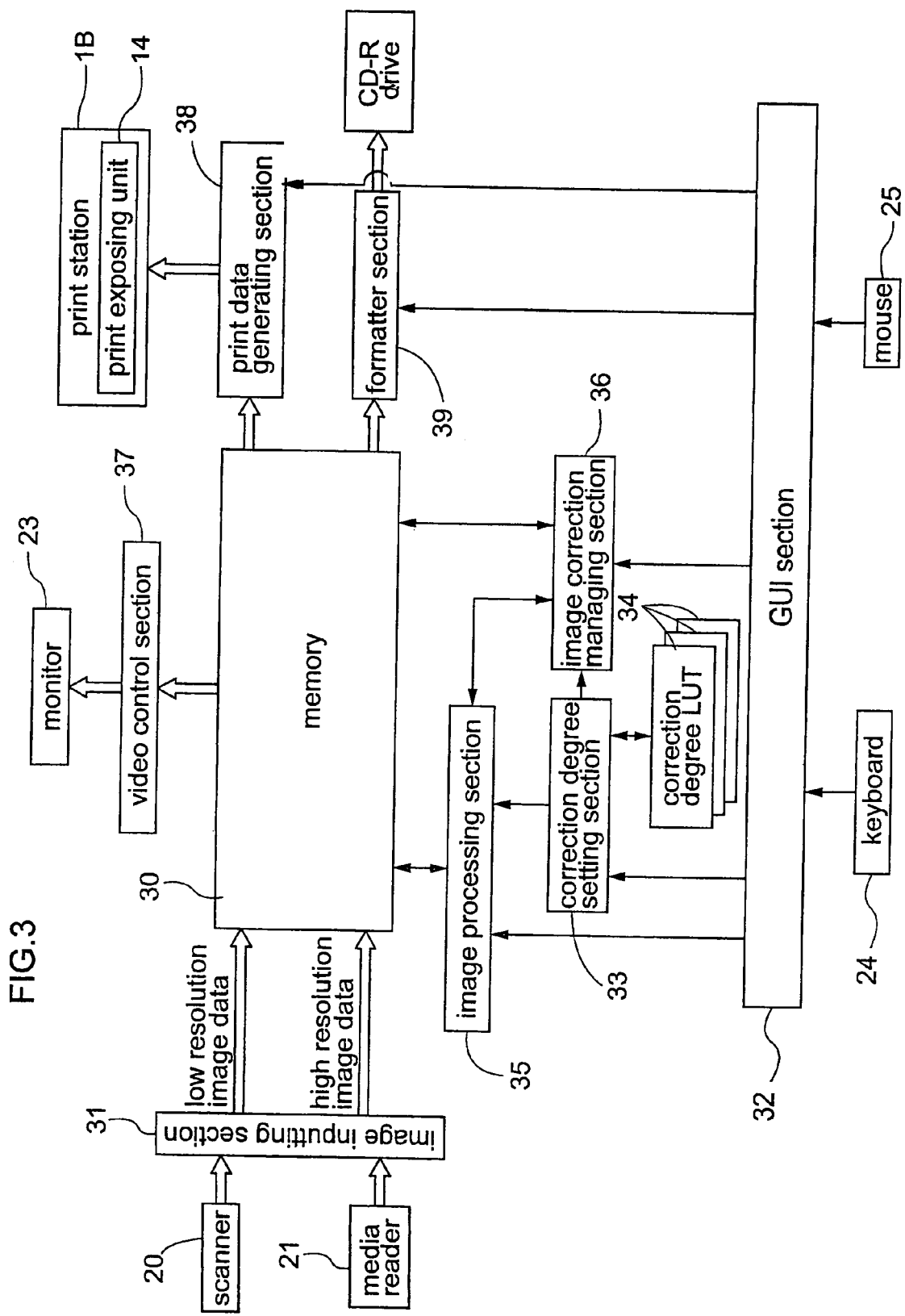
FIG. 3 is a functional block diagram illustrating functional elements integrated within a controller of the photographic printing system.

This photographic printing system is commonly referred to as "digital mini lab". As can be easily understood from FIG. 2, with the print station 1B in operation, an elongate sheet of print paper P stored in the form of a roll within one of two print paper magazines 11 is drawn out and cut by a sheet cuter 12 into pieces of a print size. Then, for each print paper piece P, a back printing unit 13 prints print-related information such as color correction information, a serial frame number etc. on its back side, while a print exposing unit 14 exposes the front side of the print paper P with a photographic image. The print paper P after this exposure is then sent into a developing tank unit 15 having a plurality of developing solution tanks for its development. The developed print paper P is then dried and sent to a transverse conveyer 16 mounted at an upper portion of the apparatus and then to a sorter 17. Such print papers P, i.e. photo prints P, sent to the sorter 17 are sorted by the unit of each customer's order and stacked on one of a plurality of trays of this sorter 17 (see FIG. 1).

A print paper conveying mechanism 18 is provided for conveying the print paper 2 at a conveying speed adapted for each of the above-described various processes to be effected on the print paper P. This print paper conveying mechanism 18 is comprised of a plurality of pinch conveyer roller pairs including chucker type print paper conveying units 18a disposed forwardly and rearwardly of the print exposing unit 14 relative to the print paper conveying direction.

The print exposing unit 14 includes a line exposing head for irradiating, along a main scanning direction, laser beams of three primary colors: R (red), G (green) and B (blue) on the print paper P conveyed along a sub-scanning direction based on the print data transmitted from the control station 1A. The developing tank unit 15 includes a color developing solution tank 15a reserving therein color developing solution, a bleaching solution tank 15b reserving therein bleaching solution, and stabilizing solution tanks 15c reserving stabilizing solution therein.

On a desk-like console of the control station 1A, there is mounted a film scanner 20 for obtaining image data representing photographic frame images from the film 2a. On the other hand, a media reader 21 for obtaining image data representing photographic frame images from various types of semiconductor memories employed as photographic image recording media 2b attached to e.g. a digital camera, a CD-R or the like is incorporated within a general-purpose computer acting as a controller 3 of this photographic printing system. This general-purpose computer is connected also to a monitor 23 for displaying various kinds of information, a keyboard 24 and a mouse 25 acting as operation input devices used as operation inputting sections for effecting various settings and adjustments.

The controller 3 of this photographic printing system includes a CPU as a main component thereof and various functional elements realized by software and/or hardware for effecting various processes including an image processing and other processes for outputting photographic prints. Some of these functional elements particularly relevant to the present invention will be described next.

An image inputting section 31 inputs the photographic image data read by the scanner 20 or the media reader 21 and effects a necessary pre-processing thereon for a subsequent processing and then transmits this as source image data for use in the image correction to a memory 30. A GUI section 32 constituting a graphic user interface produces a graphic control screen including various windows, boxes and control buttons and generates control commands according to user's control commands (by way of the pointing devices such as the keyboard 24 and the mouse 25) entered via the graphic control screen. A correction degree setting section 33 sets a correction degree for a particular image correction (e.g. an image correction for improving image quality deterioration due to a photographic lens used) on the source image data mapped in the memory 30 by using a lookup table 34. An image processing section 35 effects the particular image correction on the source image data by the correction degree set by the correction degree setting section 33 and effects an image processing such as a filtering on the source image data according to a user entered control command transmitted from the GUI section 32 or inputted directly via e.g. the keyboard 24. An image correction managing section 36 causes the monitor 23 to display correction reproduced images based on corrected image data and allows the user or operator to fixedly determine a final correction degree for the source image data while the operator views the correction reproduced images being displayed on the monitor. A video control section 37 generates video signals for causing the monitor 23 to display the correction reproduced images based on the corrected image data, a print source image and a simulated image as an anticipated finished image during a prejudge printing operation for e.g. a color correction as well as graphic data transmitted from the GUI section 32. A print data generating section 38 generates print data suitable for the print exposing unit 14 included in the print station 1B based on the final corrected image data. A formatter section 39 converts the source photographic image data or the corrected photographic image data after completion of the image correction into a format to be written into e.g. a CD-R, according to a customer's request.

In case the medium recording the photographic frame images is the film 2a, the image inputting section 31 scans the film 2a in a pre-scanning mode and a main scanning mode and then transmits the resultant scanned data obtained in these modes separately to the memory 30. In case the medium recording the photographic frame images is the memory card 2b or the like, if the photographic image data includes thumbnail data (low resolution data), the image inputting section 31 transmits this thumbnail data to the memory 30 separately from the main photographic image data (high resolution data) so that the thumbnail data may be used for the purpose of list display (matrix-like display) on the monitor 32. On the other hand, if the photographic image data do not include such thumbnail data, the image inputting section 31 creates reduced images from the main data and transmits these data as thumbnail data to the memory 30. In this way, for image data representing each photographic frame image, two kinds of data, i.e. the high resolution data and the low resolution data, are mapped in the memory 30. So that, the low resolution data is used for the correction degree setting operation for image correction, then the image correction is effected on the high resolution data by using the correction degree determined based on the low resolution data. This construction is advantageous for reducing the calculation load on the controller 3 during the correction degree determining operation.

Next, the basic technical concept of the correction degree determination technique proposed by the present invention will be detailed with reference to FIGS. 4 through 6. The concept is based on correlation among the GUI section 32, the correction degree setting section 33, the correction degree lookup table 34, the image processing section 35 and the image correction managing section 36. And, the following discussion takes correction of peripheral light amount for example.

Insufficiency in the peripheral light amount results from the lens characteristics that the light amount decreases according to the $\cos^4$ law. The correction for compensating for insufficient light amount is a process for increasing brightness for pixels distributed concentrically about the center of the image. However, the insufficiency of peripheral light amount does not necessarily vary in concentrically uniform manner. The variation may occur in a vertically oblong oval pattern or horizontally oblong oval pattern or even may occur in a reverse pattern with the light amount in the peripheral area being greater than that in the central area of the image. Therefore, this correction requires both an operation for increasing brightness and an operation for decreasing brightness from a set image center according the concentric, vertically oblong oval or horizontally oblong oval pattern. Moreover, the amount of insufficiency of the peripheral light amount also varies depending on the lens employed. For these reasons, there is wide distribution of the optimal correction amounts. Generally, the correction amount in such image correction is determined by varying coefficients in a mathematical correction expression. Hence, in this embodiment, correction expressions (correction amounts) determined by various coefficients are prepared in the form of a matrix and this matrix is stored in the correction degree lookup table 34.

Figure 4:
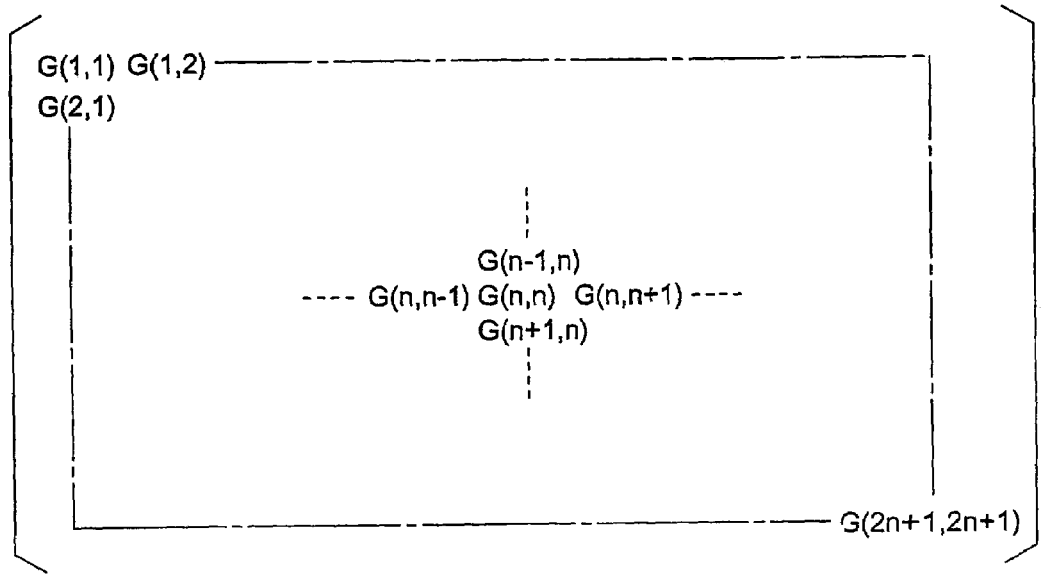
FIG. 4 is an explanatory view for explaining a schematic construction of a correction degree matrix.

FIG. 4 shows a conceptual diagram of this matrix for correction degree. In this case, $(2n+1) \times (2n+1)$ (n is a positive integer) of correction degrees (correction expressions) are prepared, each correction degree being represented by G (x, y) (x and y each can have a value from 1 to n+1). The center entry of the matrix, i.e. the correction degree: G (n, n) represents no correction at all. The correction degrees located on the right area from the center are for the correction of increasing the peripheral brightness, whereas the correction degrees located on the left area are for the correction of decreasing the peripheral brightness. Further, the correction degrees located on the upper area from the center are for the correction of correcting the peripheral light amount according to the vertically oblong oval pattern about the center, whereas the correction degrees located on the lower area from the center are for the correction of correcting the peripheral light amount according to the horizontally oblong oval pattern about the center. In any case, the farther from the center, the higher the correction intensity.

In this way, the respective correction degrees arranged in the form of matrix are stored in the correction degree lookup table 34. Therefore, when an image correction is effected on the source image data by using correction degrees retrieved from the table 34, $(2n+1) \times (2n+1)$ units of corrected image data are generated. Of these data, the corrected image data corresponding to the above-described correction degree of G (n, n) representing no correction is actually an "uncorrected" image data. However, for the sake of convenience of explanation, all of these data including this will be referred to as "corrected" image data, except where particular distinction therebetween is needed. For the sake of convenience of understanding, it may be considered that the these image data are mapped in the memory 30 in the form of a matrix shown in FIG. 5. In FIG. 5, the image data are represented by: IM (x, y) (x and y each has a value from 1 to (n+1)) and the uncorrected image data located at the center is represented by: IM (n, n), which is identical to the source image data. That is, assuming n=50, at this stage 101×101=10201 units of different corrected image data including the un-corrected image data will be generated.

As it is impossible for the monitor 23 to display at one time all correction reproduced images based on these corrected image data, the monitor 23 will display e.g. a certain limited number of images (e.g. 9 images) which can be observed and compared with each other. In this, in the first monitor screen shown as a 3×3 frames display screen shown in FIG. 6a, a photographic frame image, as a reproduced image, based on the corrected image data (actually the source image data) represented by IM (n, n) is displayed at the center of the screen. This image based on the "corrected" image data is actually an un-corrected reproduced image. However, in this case too, for the sake of convenience, all images will be referred to as "correction reproduced images" except where a special distinction is needed. In the periphery of this center image, correction reproduced images (photographic frame images) based on the corrected image data: IM (n−1, n−1) . . . , IM (n+1, n+1) adjacent IM (n, n) will be displayed. That is, in this monitor screen, around the non-corrected reproduced image as the center, on the right side thereof, there will be displayed a correction reproduced image with slightly increased peripheral area brightness according to the concentric pattern. On the obliquely right upper area, there will be displayed a correction reproduced image with slightly increased peripheral area brightness according to the vertically oblong oval pattern from the set center. On the obliquely right lower side, there will be displayed a correction reproduced image with slightly increased peripheral area brightness according to the horizontally oblong oval pattern from the center. On the left side, there will be displayed a correction reproduced image with slightly increased peripheral area brightness according to the concentric pattern. On the obliquely left upper side, there will be displayed a correction reproduced image with slightly increased peripheral area brightness according to the vertically oblong pattern from the center. On the obliquely left lower side, there will be displayed a correction reproduced image with slightly increased peripheral area brightness according to the horizontally oblong oval pattern from the center. Immediately upwardly or downwardly of the center image, there will be displayed a correction reproduced image having an intermediate brightness between the adjacent images.

Figure 5:
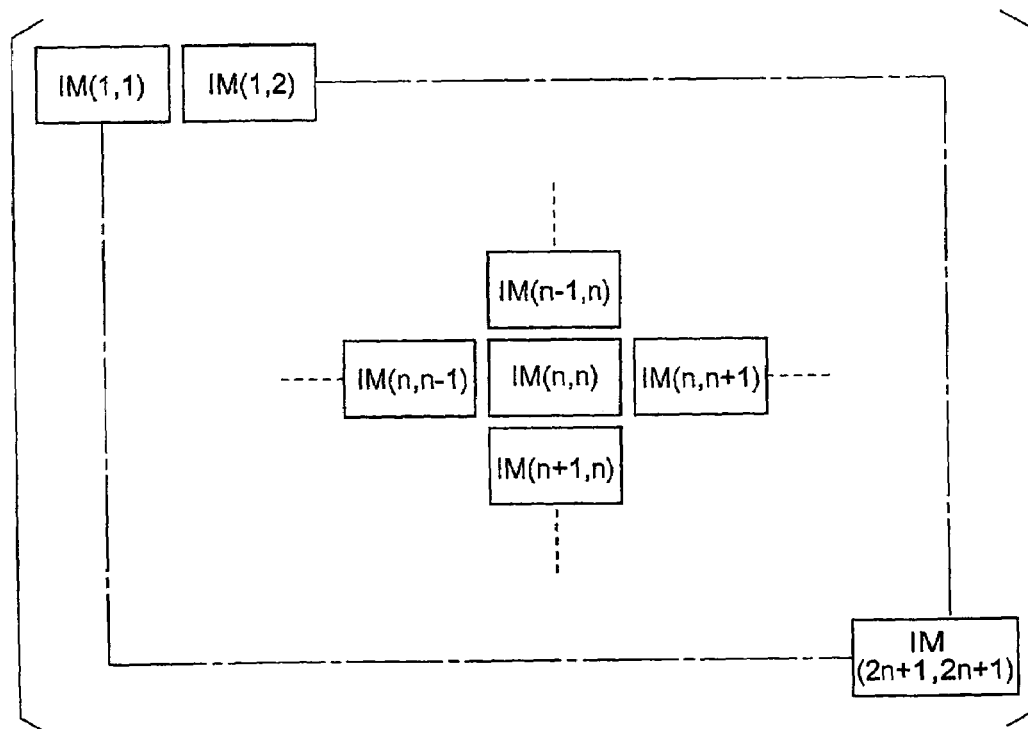
FIG. 5 is an explanatory view for explaining a schematic construction of corrected image data provided in the form of a matrix.

Further, when the operator selects, from these correction reproduced images first displayed, one having a desired directionality, in response to this, the monitor 23 displays a new set of correction reproduced images based on the group of corrected image data located adjacent around the image data corresponding to the selected correction reproduced image in the matrix shown in FIG. 5. For instance, if the corrected image data selected in FIG. 6a is IM (n−1, n+1), then, as shown in FIG. 6b, the monitor 23 displays, in the next (revised) screen, the correction reproduced image corresponding the corrected image data: IM (n, n) (i.e. the non-corrected image data) on the left lower side and the correction reproduced image corresponding to the corrected image data: IM (n−2, n+2) on the right upper side. That is to say, the new group of correction reproduced images has shifted to the obliquely right side from the center in the matrix shown in FIG. 5 relative to the first displayed group of correction reproduced images. Hence, the correction reproduced images of the new group have the tendency of increased peripheral brightness according to the vertically oblong oval pattern. In this manner, as a new group of correction reproduced images based on corrected image data included in a predetermined submatrix in the matrix of corrected image data shown in FIG. 5 is displayed in a continuous manner, the operator can arrive at a target correction reproduced image with a desired image correction in a speedy and reliable manner. And, this continuous display of the new group of correction reproduced images based on the corrected image data included in the submatrix is effected instantaneously since all the corrected image data were generated and stored in advance by using the correction degree matrix stored in the correction degree lookup table 34.

For the purpose of reduction in the processing time, the corrected image data comprise the low resolution image data. However, once the best one has been determined from the continuously displayed correction reproduced images according to a desired correction direction as described above, the particular correction degree for creating this optimal correction reproduced image is stored. Then, at the time of photographic print output, an image correction is effected on the high resolution image data by using this stored correction degree.

Next, there will be described a typical process using this photographic printing system for effecting an image correction, when needed, for a defect due to a photographic lens while the operator monitors the photographic frame images on the monitor screen.

Depending on the kind of the photographic recording medium brought by a customer as a print source, either the film scanner 20 or the media reader 21 is used. In either case, as described hereinbefore, image data obtained by digitization of the photographic frame images are transmitted in the two forms of the high resolution image data and the low resolution image data via the image inputting unit 31 to the memory 30.

Figure 7:
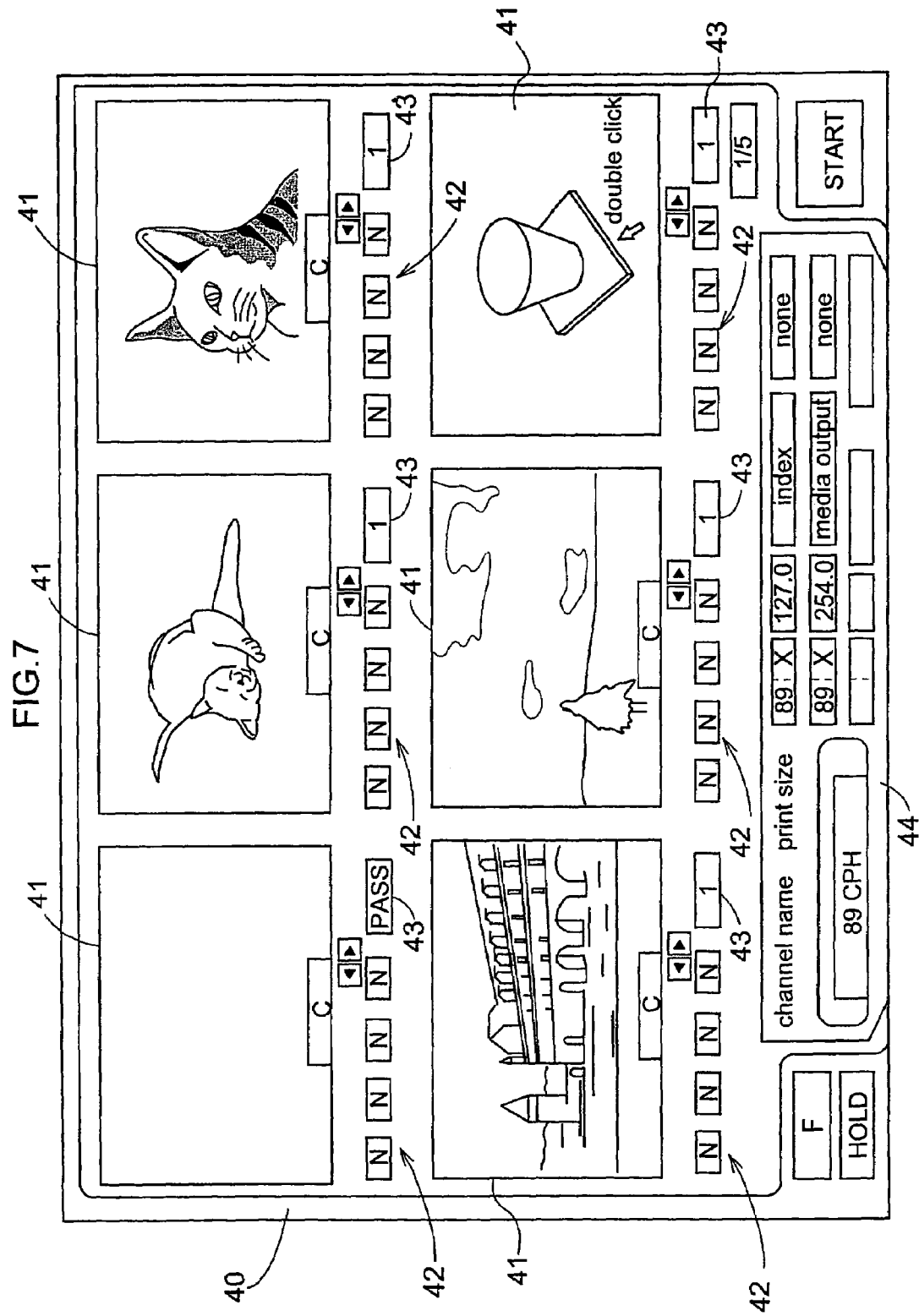
FIG. 7 shows a prejudge screen.

When the image data have been loaded in the memory 30, photographic frame images corresponding to the image data are displayed one after another in respective image display frames 41 of an operational input screen 40 shown in FIG. 7 referred to as "prejudge screen" herein. In the example of FIG. 7, the operator has selected six-frame display screen. Under each image display frame 41, there are arranged a color density correction setting area 42 and a print number setting area 43. The color density correction setting area 42 includes setting boxes of "yellow", "magenta", "cyan" and "density" and a correction amount "N" means neutral, i.e. no correction. The print number setting area 43 includes a print number inputting box and the language "PASS" shown in the box means no printing is to be effected on this frame image. At the lower area of the prejudge screen 40, there is provided a print condition display column 44 which shows a name of "print channel" (a predetermined set or series of print control operations) selectively applied to this particular photo print output, print sizes included in this print channel, need or no-need of index printing, need or no-need of media output, etc. The print size represents the size of a finished photo print P. In this embodiment, the print size is determined by a width of the print paper and a feeding length of the same. Upon completion of various settings of the various correction settings, the print number setting for each photographic frame image in this prejudge screen 40, the corresponding image data are transmitted to the print data generating section 38 to be converted into the print data.

Figure 8:
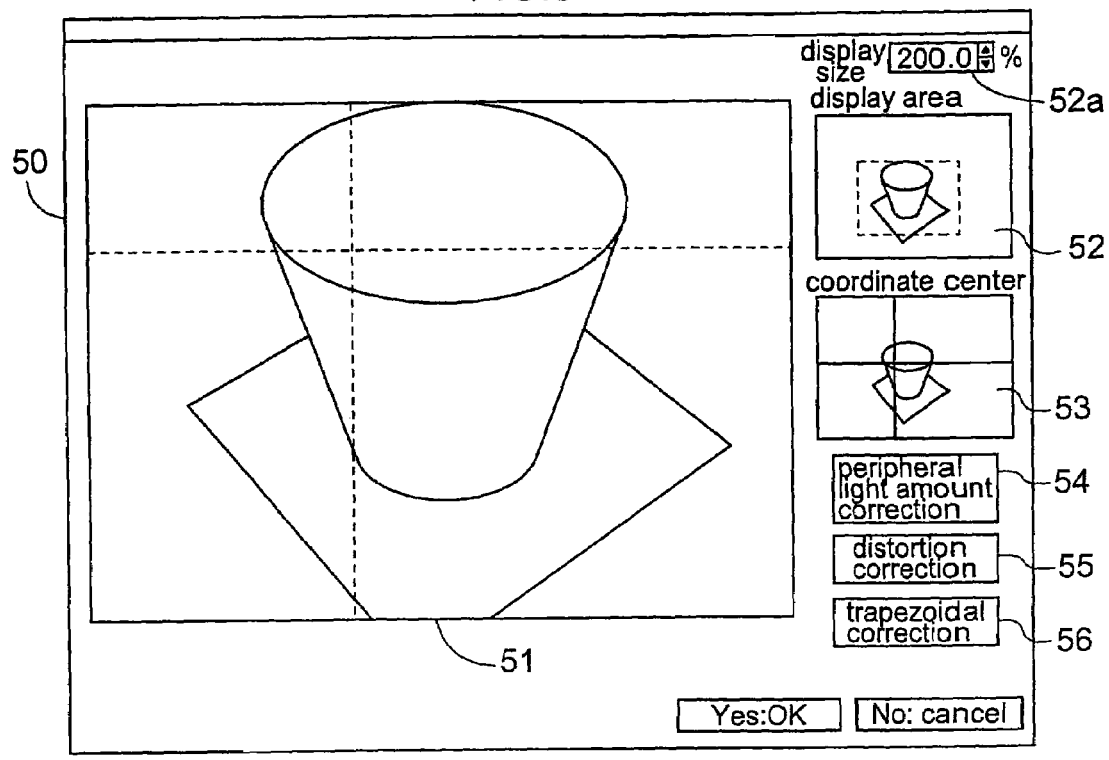
FIG. 8 shows a correction main screen.

If a correction degree is to be set for an image correction for improving lens-related image quality deterioration including the swing/tilt distortion, in the prejudge screen 40, the operator will specify a frame image to be subjected to such special processing by e.g. double-clicking of the mouse 25, upon which the display is switched to a correction main screen 50 as exemplarily shown in FIG. 8. At the center of this correction main screen 50, there is provided an enlarged image display area 51. And, adjacent the right end of the screen, there are arranged a display confirming area 52 for showing the area within the frame image and currently displayed in an enlarged scale in the enlarged image display area 51 by encircling the area in a box of dot line, a coordinate center confirming area 53 for showing the coordinate center used as the reference for correction, a peripheral light amount correcting button 54, a distortion correcting button 55, and a trapezoidal correcting button 56. The operator can change the area to be displayed in the enlarged image display area 51 by moving the box of dot line in the display confirming area 52 by manipulating the mouse 25. Further, by changing a magnification in the display size area 52a, the operator can enlarge/reduce the image displayed in the enlarged image display area 51. Further, the setting of the coordinate center as the reference for correction can be adjusted by dragging and dropping a cross line shown in the enlarged image display area 51.

Figure 9:
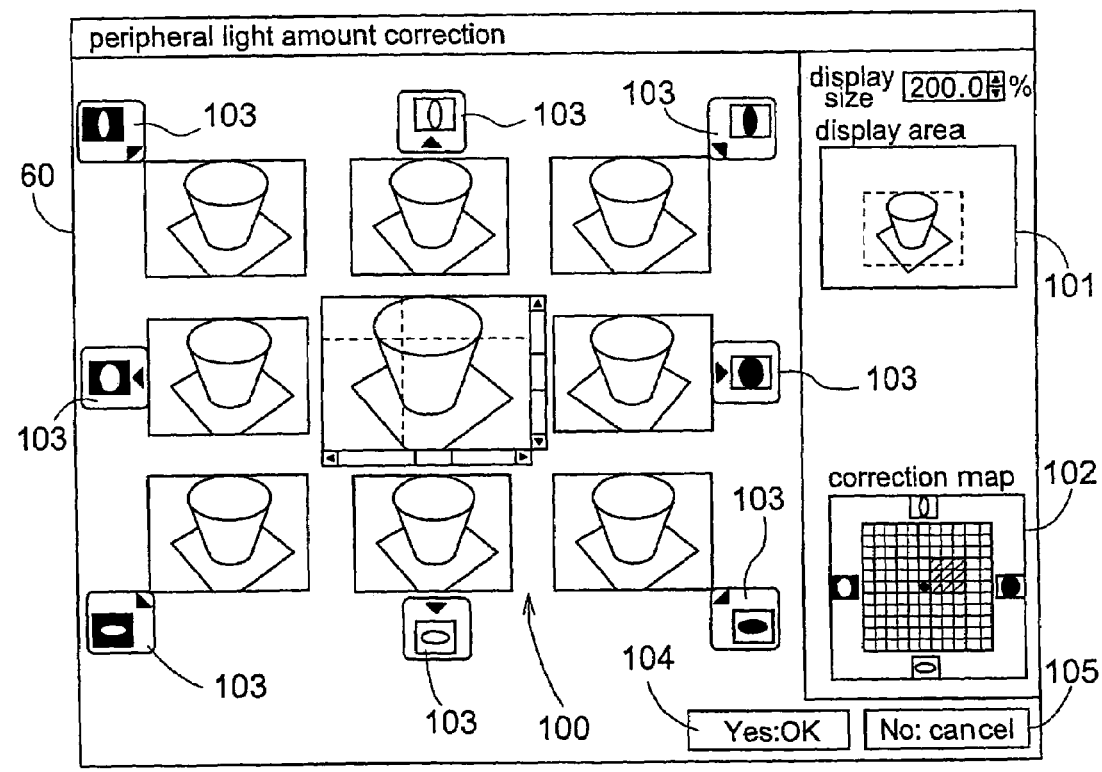
FIG. 9 shows a peripheral light amount correction screen.
Figure 10:
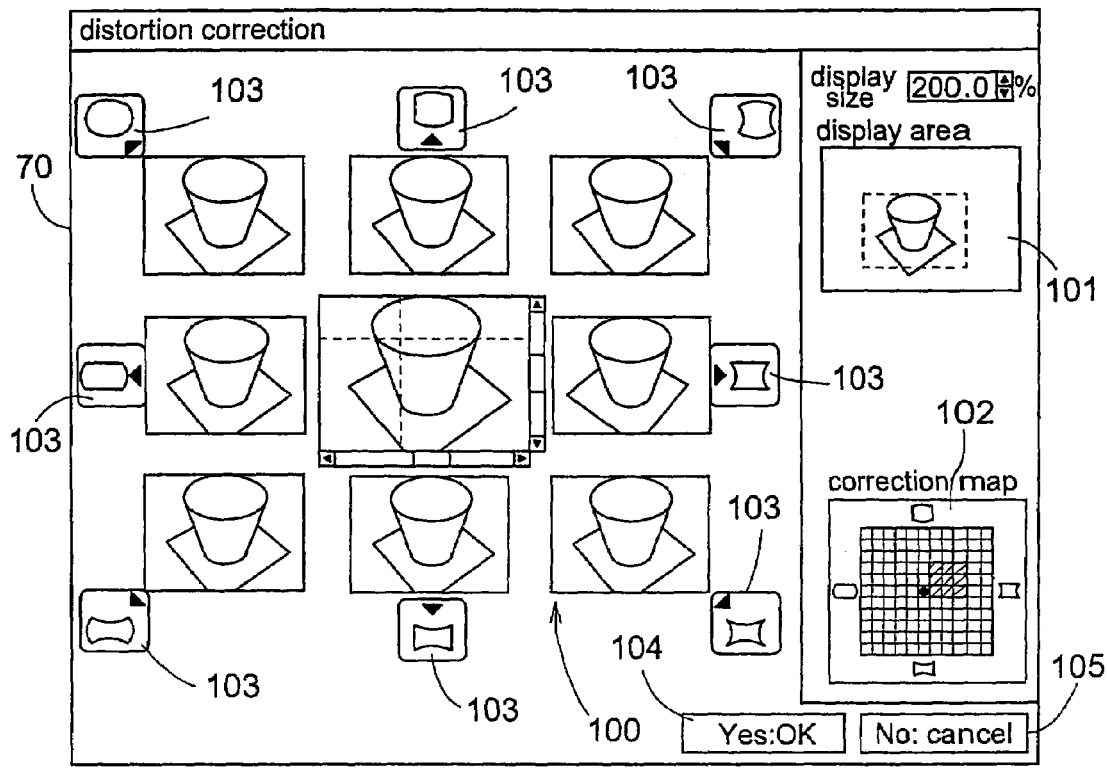
FIG. 10 shows a distortion correction screen.
Figure 11:
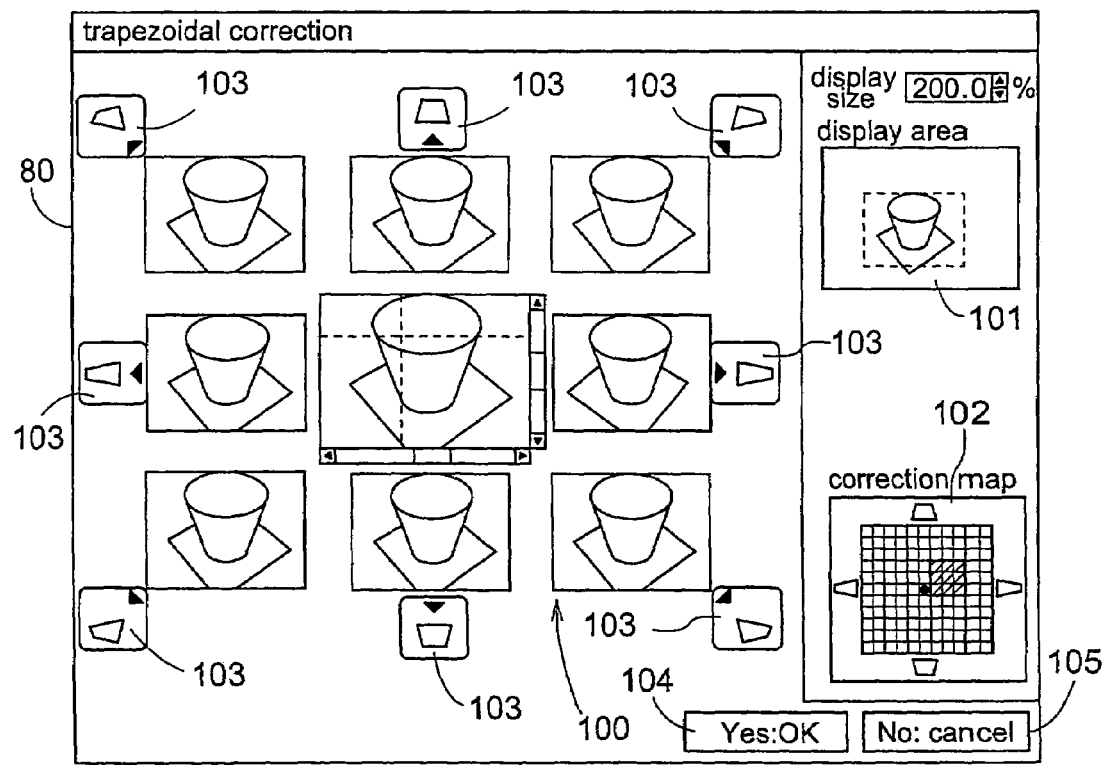
FIG. 11 shows a trapezoidal correction screen.

In this correction main screen 50, a clicking of the peripheral light amount correcting button 54 will display a peripheral light amount correction screen 60 shown in FIG. 9, a clicking operation of the distortion correcting button 55 will display a distortion correction screen 70 shown in FIG. 10 and a clicking of the trapezoidal correcting button 56 will display a trapezoidal correction screen 80 shown in FIG. 11, respectively, so that the setting operation of a correction degree for each desired type of image correction is made possible.

These correction screens have substantially same configurations. At the center of the screen, there is arranged a reproduced image matrix display area 100 for displaying the series of correction reproduced images based on the nine units of image data: IM (x, y). On the right side area of the screen, there are arranged a display confirming area 101 for showing a portion of the correction reproduced images displayed in the respective frames of the reproduced image matrix display area 100 and a correction map 102 for mapping the matrix of all the corrected image data generated by using the correction degree matrix stored in the correction degree lookup table 34 and showing the group of correction reproduced images being displayed in the reproduced image matrix display area 100 by e.g. a different color than the other(non-selected) images for allowing visual distinction therebetween. Further, at the four corners of the reproduced image matrix display area 100 and on the outer side of four at mid points, there are provided icon buttons 103 having marks or icons indicative of respective types of image correction and directions corresponding thereto. Then, in response to clicking one of these icon buttons 103, the group of correction reproduced images currently displayed on the reproduced image matrix display area 100 will be switched over or rewritten into a new group of correction reproduced images shifted by one entry in the direction of the clicked icon button 103. Further, by moving the group of correction reproduced images shown in the correction map 102 with the color distinction by manipulation of the mouse 25, the correction reproduced images (3×3 submatrix) displayed in the reproduced image matrix display area 100 can be jump-changed collectively.

Each correction screen further includes an OK button 104. In response to clicking of this button 104, the correction degree for creating the correction reproduced image presently displayed at the center of the reproduced image matrix display area 100 is stored for use in a subsequent image correction to be effected on the high resolution image data for photo print output. The screen further includes a cancel button 105.

In response to clicking of this button 105, the display is returned to the previous screen, whereby the ongoing correction operation can be returned to the condition one step before.

Next, the above-described process of operator's setting of a correction degree in an image correction will be explained with reference to the flowchart of FIG. 12.

First, when this image correction routine is started, the correction main screen 50 is displayed (step #01). Then, the operator will set the coordinate center as the reference for the correction (step #02). As this coordinate center, a point free or almost free from e.g. distortion may be selected. Next, a desired item (type) of image correction is selected (step #03). In this embodiment, "peripheral light amount correction", "distortion correction" and "trapezoidal correction" are available as items of image correction. In this example, it is assumed that the peripheral light amount correction has been selected. It is noted that the substantially identical process is effected when any other item of image correction is selected.

Then, the process reads the correction degree matrix for peripheral light amount correction from the correction degree lookup table 34 (step #04). As described hereinbefore, this correction degree matrix includes 101×101 units of correction degrees (correction expressions), then, an image correction operation is effected on the source image data with these correction degrees, thereby to obtain 101×101 units of corrected image data (step#05). And, these corrected image data are rendered into a matrix as shown in FIG. 5.

Next, in order to display the peripheral light amount correction screen 60, corrected image data for a correction reproduced image to be displayed at the center of the reproduced image matrix display area 100 is set (step #07) and eight image data peripherally thereof are also set (step #08). Based on the image data set at steps #07 and #08, total 9 (nine) correction reproduced images are displayed in the reproduced image matrix display area 100 (step #09).

In the peripheral light amount correction screen 60, the process checks whether a correction degree has been determined or not by clicking of the OK button 104 (step #10) and checks also whether a correction direction has been set or not by clicking of one icon button 103 indicative of a correction direction (step #11). If a new correction direction has been set (YES branched at step #11), based on this set direction, a correction image data is set for a correction reproduced image to be newly displayed at the center of the reproduced image matrix display area 100 (step #12) and the process jumps to step #08. If the OK button 104 is clicked (YES branched at step #10), the correction degree for making the correction reproduced image presently displayed at the center of the reproduced image matrix display area 100 is stored, and this routine is ended.

In the foregoing embodiment, the process generates corrected image data using all of the correction degrees (correction expressions) included in the correction degree matrix read from the correction degree lookup table 34. Instead, the process may be modified such that only a certain limited number (more than, preferably twice greater than, the number of the corresponding images to be displayed at one time in the reproduced image matrix display area 100) are generated first, and then, corrected image data for an area expected from the correction direction set by clicking of the icon button 103 are generated.

In the foregoing embodiment, the print station 1B employs the so-called silver salt photographic printing technique wherein the print paper B is subjected to an exposure of photographic images by the print exposing unit 14 having an exposure engine and the exposed print paper P is then subjected to a plurality of stages of developing operations. Needless to say, the print station 1B employed in this invention is not limited thereto. Instead, various other types of photographic printing techniques may be employed, such as an ink jet printing technique for jetting ink onto a film or paper for forming an image thereon or heat transfer printing technique using a thermal transfer sheet.

The invention claimed is:

1. A method of determining image correction comprising the steps of:
    obtaining image data representing a photographic frame image as source image data;
    generating corrected image data by effecting an image correction by a predetermined correction degree on the source image data, wherein said image correction comprises correcting image deterioration in two-dimensional characteristics of said photographic frame image, and wherein said predetermined correction degree is determined by a correction direction degree representing a two-dimensional direction and a correction intensity degree representing an intensity of said image correction on said photographic frame image;
    displaying a corrected reproduced image based on the corrected image data on a monitor; and
    fixedly determining a final correction degree for an image correction to be eventually effected on the source image data while monitoring the corrected reproduced image; and
    wherein the step for generating corrected image data comprises the step of providing a correction degree matrix having entries with differing correction degrees, with one of correction direction and correction density being associated with a column of said correction degree matrix and the other being associated with a row of said correction degree matrix, and generating a plurality of corrected image data by effecting the image correction on the source image data with a plurality of differing correction degrees; and
    wherein the displaying step comprises the step of displaying a plurality of corrected reproduced images based on selected ones from the plurality of corrected image data on the monitor in correspondence with the entries of said correction degree matrix.

2. The method according to claim 1, wherein said image correction is for improvement of photographic-lens-related image quality deterioration.

3. The method according to claim 1, wherein the plurality of the corrected reproduced images are displayed on the monitor in the form of a display matrix having a size which can be freely set.

4. The method according to claim 3, wherein in response to specification of one of the correction reproduced images in the display matrix, a new display matrix is created with said specified correction reproduced image as its center.

5. The method according to claim 2, wherein a correction degree fixedly determined for one particular photographic frame image is applied to image correction on the other photographic frame images obtained by a same photographic lens.

6. A computer-readable medium comprising code for determining image correction, said code comprising computer-executable instructions for:
    obtaining image data representing a photographic frame image as source image data;
    generating corrected image data by effecting an image correction by a predetermined correction degree on the obtained source image data, wherein said image correction comprises correcting image deterioration in two-dimensional characteristics of said photographic frame image, and wherein said predetermined correction degree is determined by a correction direction degree representing a two-dimensional direction and a correction intensity degree representing an intensity of said image correction on said photographic frame image;
    displaying a corrected reproduced image based on the corrected image data on a monitor; and
    fixedly determining a final correction degree for an image correction to be eventually effected on the source image data while monitoring the corrected reproduced image;
    wherein the instruction for generating corrected image data comprises instructions for providing a correction degree matrix having entries with differing correction degrees, with one of correction direction and correction density being associated with a column of said correction degree matrix and the other being associated with a row of said correction degree matrix, and generating a plurality of corrected image data by effecting the image correction on the source image data with a plurality of differing correction degrees; and
    wherein the instruction for displaying comprises an instruction for displaying a plurality of corrected reproduced images based on selected ones from the plurality of corrected image data on the monitor in correspondence with the entries of said correction degree matrix.

7. An image processing apparatus, comprising:
    an image inputting section for obtaining image data representing a photographic frame image, as source image data;
    a correction degree setting section for setting a correction degree for a particular image correction for the source image data;
    an image processing section for effecting the image correction on the source image data by the correction degree to generate a corrected image data; and
    an image correction managing section for causing a monitor to display a corrected reproduced image based on the corrected image data and allowing an operator to fixedly determine a final correction degree for the image correction to be eventually effected on the source image data while monitoring the corrected reproduced image on the monitor; and
    wherein said correction degree section is operable to determine the correction degree by a correction direction degree representing a two-dimensional direction and a correction intensity degree representing an intensity of the image correction on said photographic frame image;
    wherein said image processing section is operable to:
        correct image deterioration in two-dimensional characteristics of said photographic frame image;
        provide a correction degree matrix having entries with differing correction degrees, with one of correction direction and correction density being associated with a column of said correction degree matrix and the other being associated with a row of said correction degree matrix; and
        generate a plurality of corrected image data by effecting the image correction on the source image data with a plurality of differing correction degrees; and
    wherein said image correction managing section is operable to cause the monitor to display a plurality of corrected reproduced images based on selected ones from the plurality of corrected image data in correspondence with the entries of said correction degree matrix.

8. The apparatus according to claim 7, wherein said image correction is for improvement of photographic-lens-related image quality deterioration.

9. The apparatus according to claim 7, wherein the plurality of the corrected reproduced images are displayed on the monitor in the form of a display matrix having a size which can be freely set.

10. The apparatus according to claim 9, wherein in response to specification of one of the correction reproduced images in the display matrix, a new display matrix is created with said specified correction reproduced image as its center.

11. The apparatus according to claim 8, wherein a correction degree fixedly determined for one particular photographic frame image is applied to image correction on the other photographic frame images obtained, by a same photographic lens.

12. The apparatus according to claim 7, wherein said correction setting section includes a correction degree lookup table comprised of a correction degree matrix including a plurality of correction degrees defined by a correction direction and a correction intensity in the photographic frame image arranged therein as entries thereof.

* * * * *

UNITED STATES PATENT AND TRADEMARK OFFICE
CERTIFICATE OF CORRECTION

| | | |
|---|---|---|
| PATENT NO. | : 7,589,863 B2 | Page 1 of 1 |
| APPLICATION NO. | : 11/020047 | |
| DATED | : September 15, 2009 | |
| INVENTOR(S) | : Koji Kita | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1243 days.

Signed and Sealed this

Twenty-first Day of September, 2010

David J. Kappos
*Director of the United States Patent and Trademark Office*